Sept. 25, 1923.
W. E. KOCH
1,469,161
CORN HARVESTING MACHINE
Filed March 21, 1921    5 Sheets-Sheet 1
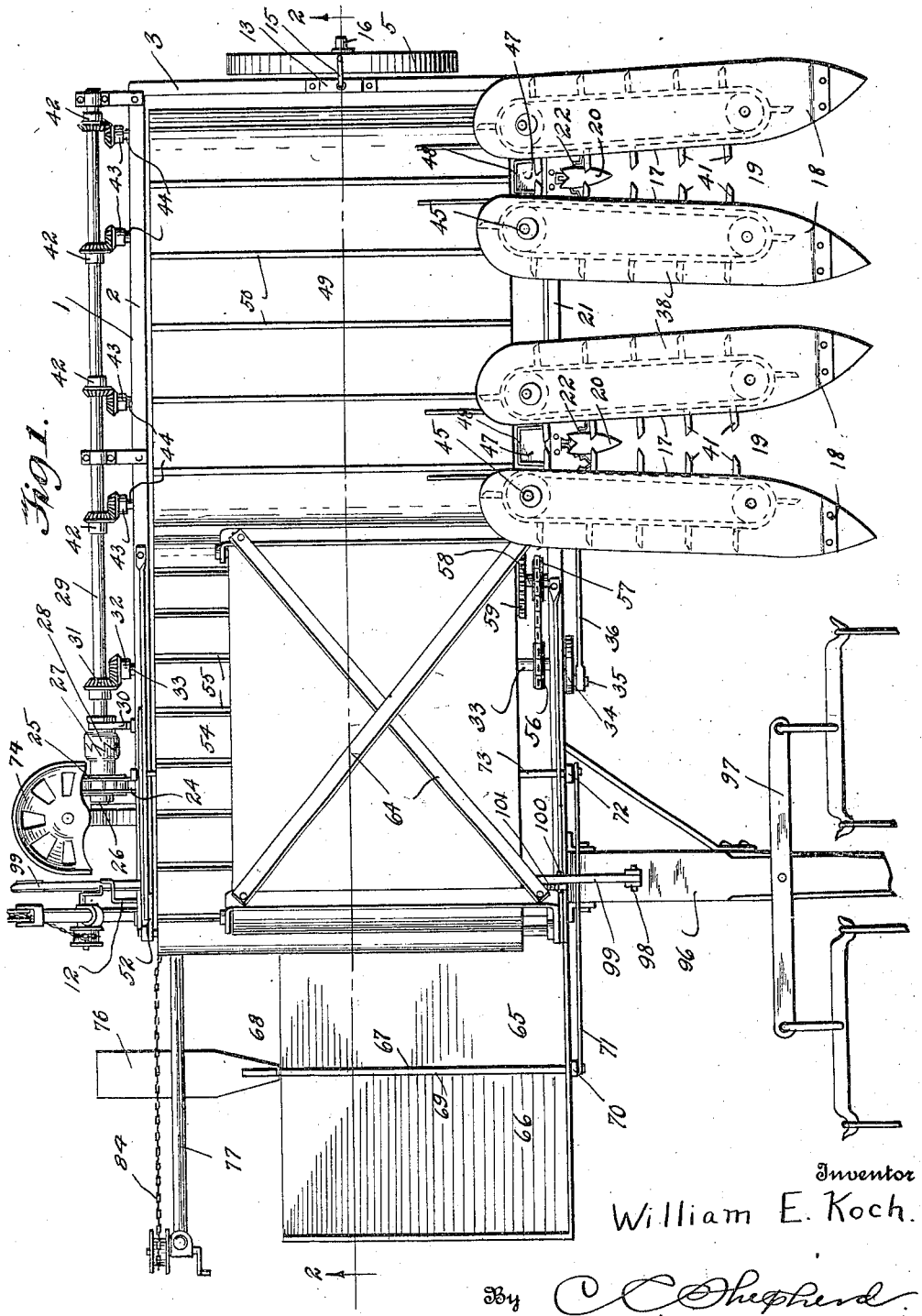
Inventor
William E. Koch.
By C. C. Shepherd
Attorney

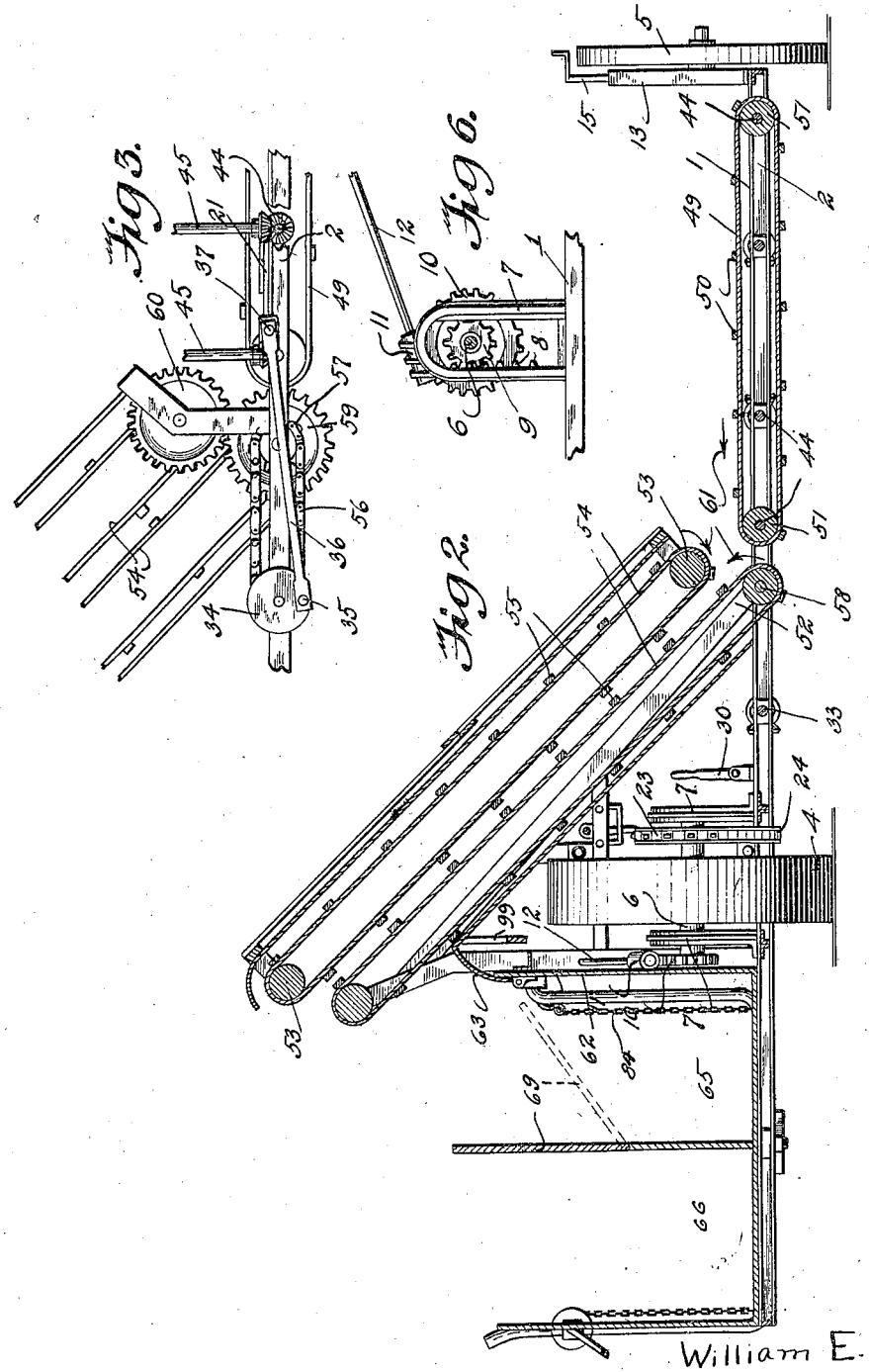

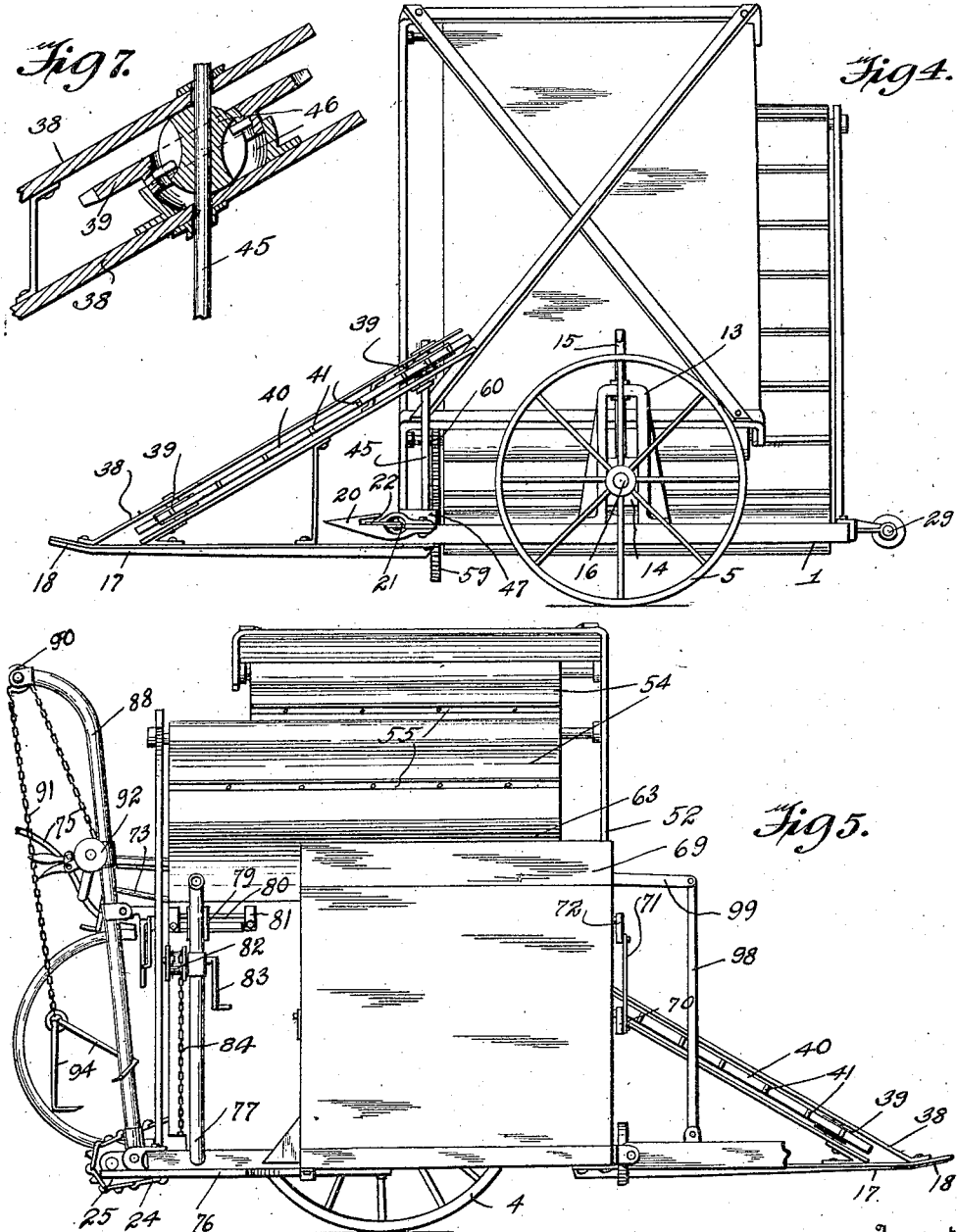

Sept. 25, 1923.

W. E. KOCH

CORN HARVESTING MACHINE

Filed March 21, 1921   5 Sheets-Sheet 4

1,469,161

Inventor
William E. Koch.
By C. Shepherd
Attorney

Sept. 25, 1923. 1,469,161
W. E. KOCH
CORN HARVESTING MACHINE
Filed March 21, 1921 5 Sheets-Sheet 5
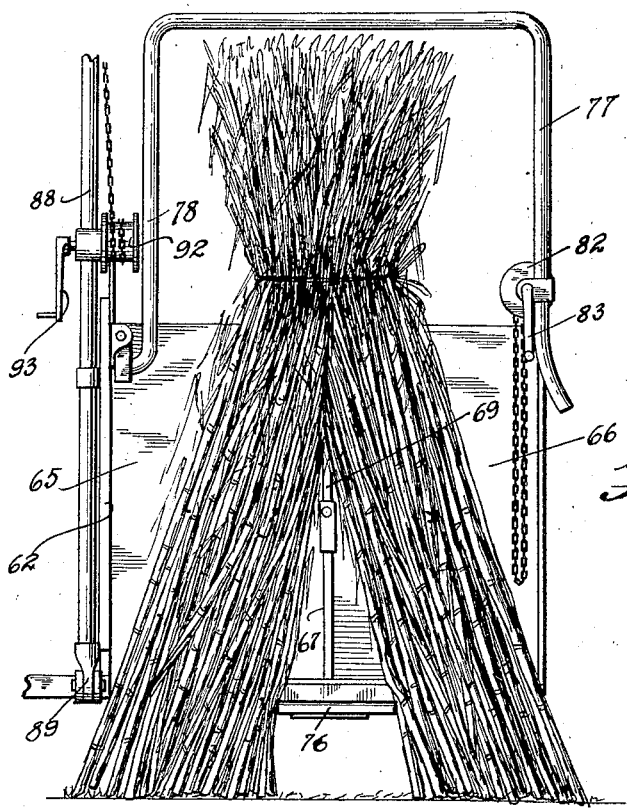
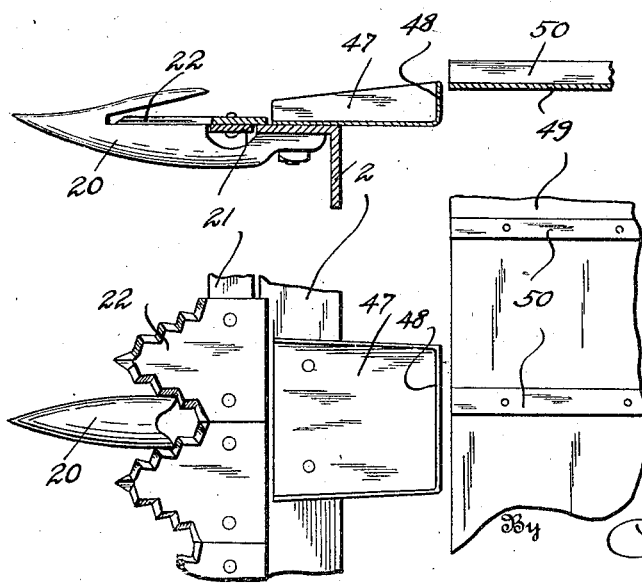
Inventor
William E. Koch.
By C. C. Shepherd
Attorney Patented Sept. 25, 1923.

1,469,161

UNITED STATES PATENT OFFICE.

WILLIAM E. KOCH, OF CARROLL, OHIO.

CORN-HARVESTING MACHINE.

Application filed March 21, 1921. Serial No. 453,957.

*To all whom it may concern:*

Be it known that I, WILLIAM E. KOCH, a citizen of the United States, residing at Carroll, in the county of Fairfield and State of Ohio, have invented certain new and useful Improvements in Corn-Harvesting Machines, of which the following is a specification.

This invention relates to an improved corn harvesting machine, and has for its primary object to provide a machine of this nature which, when in operation will serve to cut the corn, to collect and convey the severed corn to suitable receptacles and to provide improved facilities for enabling the corn to be readily removed from the receptacles in a bound, upright and in finished shock formation.

In carrying out the invention, use is made of a corn harvester which is formed to include a horizontally traveling conveyor and a pair of angularly and upwardly extending conveyors, the horizontal conveyor being disposed to receive the corn stalks severed by the cutting mechanism of the machine, and the upwardly inclined conveyors being situated to receive the stalks discharged from the horizontal conveyor so that said stalks may be conveyed upwardly and discharged therefrom into any one of a plurality of receptacles, a pivoted bail member being provided at the open rear ends of the receptacle and formed to carry a chain and windless construction which latter operates to permit of the binding of the stalks disposed within the receptacles, the said harvester further including a manually operated crane structure, which is adapted to be employed for the purpose of elevating the stalks from a horizontal to a vertical position after being bound by said chain, and to enable said stalks to be removed from the receptacles and deposited upon the ground in a finished condition.

A further object of the invention resides in the provision of an adjustable deflector plate which is adapted to cooperate with the elevator conveyors for the purpose of selectively directing the stalks into either of the receptacles.

Other objects of the invention reside in the provision of an adjustable center part disposed intermediately of said receptacles and extending longitudinally from the lower portions thereof, the said center bars serving to spread or widen the base portions of the shocks produced by the harvester, in order that when said shocks are finally discharged from the machine the same will be enabled to stand alone or unsupported; in constructing the pivoted bail member so the latter may be swung to assume positions clear of the shocks when the latter are being discharged from the machine; in the provision of a chain and tongue construction in combination with the crane structure for the purpose of assisting in gripping and elevating the shocks from horizontal to vertical positions, in the provision of improved means for regulating the effective height of operation of the machine.

With these and other objects in view, as will appear as the description proceeds, the invention accordingly consists in the novel features of construction, combinations of elements and arrangements of parts, hereinafter to be fully described and pointed out in the appended claims.

In the accompanying drawings, forming a part of this specification, in which similar characters of reference denote like and corresponding parts throughout the several views thereof:

Figure 1 is a top plan view of a corn harvester constructed in accordance with the principles of the present invention, Figure 2 is a vertical longitudinal sectional view taken through the harvester along the plane disclosed by the line 2—2 of Figure 1;

Figure 3 is a detail front elevation disclosing the driving connections for the conveyors and the cutting mechanism, Figure 4 is an end elevation of the cutter side of the harvester, Figure 5 is a similar view of the shock forming side, Figure 6 is a detail view of the mechanism employed for adjusting the frame of the machine relatively to the axle of the main driving wheel, Figure 7 is a detail view disclosing the drive mechanism for the gathering conveyors, Figure 8 is a fragmentary perspective view of the shock forming end of the harvester.

Figure 9 is a detail view of the deflector plate utilized in controlling the discharge of stalks into the shock receptacles, Figure 10 is a detail elevation of the mounting for the pivoted bail member, Figure 11 is a sectional view taken along the line 11—11 of Figure 10, Figure 12 is a rear elevation of the shock from the end of the machine and disclosing more particularly the position of a finished shock, the final shape thereof, and the position of the pivoted bail member when the latter is swung to release the shock.

Figure 13 is a detail vertical section taken through the cutter mechanism, and

Figure 14 is a top plan view of said mechanism.

Figure 8:
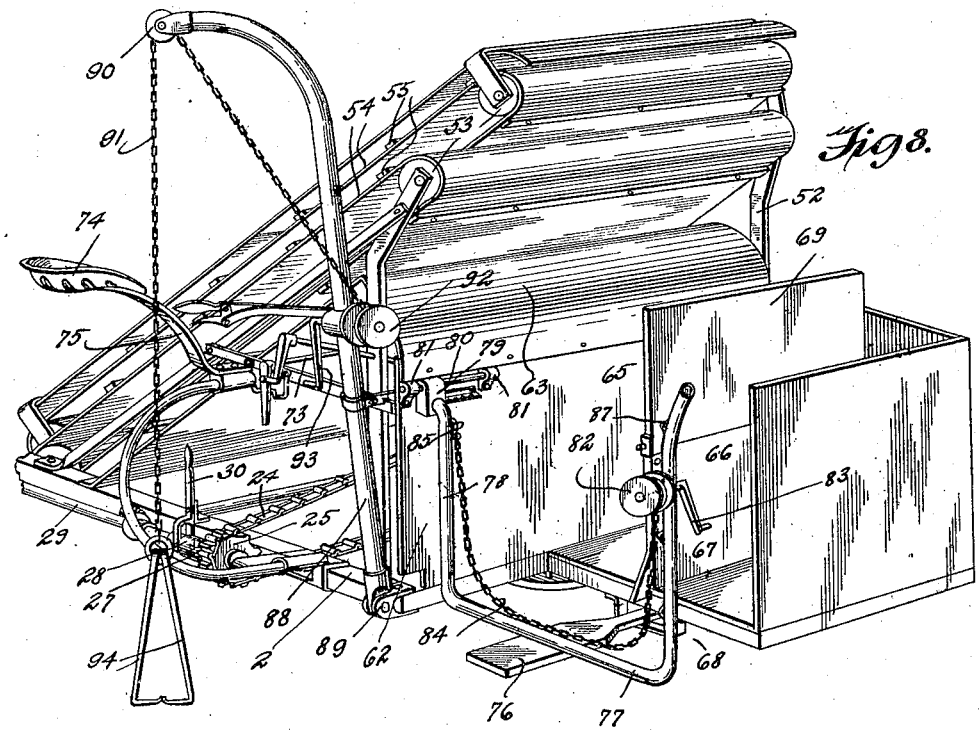
Figure 9:
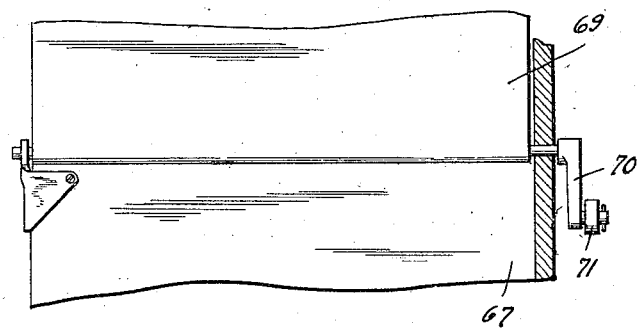
Figure 10:
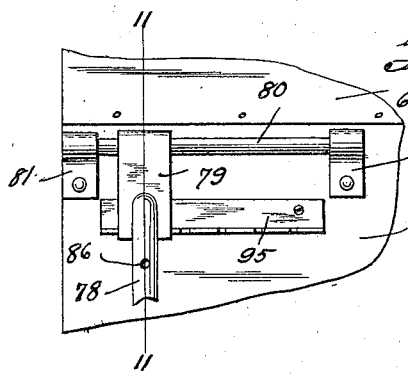
Figure 11:
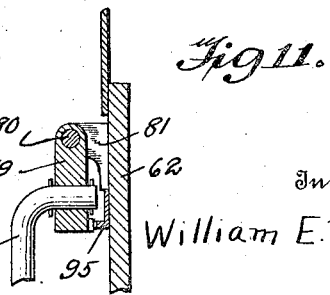

Referring more particularly to the structural details of the corn harvester comprising the preferred form of the present invention, the numeral 1 designates a horizontally disposed platform or frame, designated generally by the numeral 1, said platform consisting in this instance of a plurality of spaced longitudinally extending metallic bars 2, which are rigidly united to produce a solid and substantial construction by means of transversely extending angle irons 3, the members 2 and 3 being rigidly and securely connected in the usual manner to produce a staunch and strong construction. The frame is portably supported by means of main and side wheels 4 and 5 respectively, the former being suitably mounted for rotation intermediately of the length of the platform, and including a relatively broad tread and a suitable axle 6 which projects beyond both sides of the tread of the wheel, the ends of said axle being disposed within slotted bearings 7, extending vertically, in spaced relation, from the platform 1 and to each side of the wheel 4. The bearings 7 are suitably slotted and have certain of the walls thereof provided in this instance with rack teeth 8, which are adapted to engage with pinions 9 provided upon opposite ends of the axles 6. In the extreme outer portion one of the ends of said axle is provided with a worm gear 10, which meshes with a worm 11 provided upon the forward end of a rearwardly extending movable shaft 12. Manifestly, by rotating the shaft 12 movement will be imparted to the axle 6 through the medium of the gearing 10 and 11. This movement results in rotating the pinions 9, which thereby operate to raise or lower the platform 1 by engaging with the teeth 8 of the bearings 7. It will of course be appreciated that the wheel 4 will be permitted to rotate freely and loosely about the axle 6, and that the worm gearing will serve to lock and retain the platform in any of its adjusted positions. In order that the frame may be likewise adjusted with respect to the side wheel 5, the said frame or platform is provided at one end with an upstanding bracket 13, which carries a vertically movable block 14, the latter being raised and lowered through the instrumentality of a manually adjusted screw 15. The block 14 carries a projecting axle 16 around which the side wheel 5 is loosely rotatable. It will be apparent that by the vertical adjustments provided in connection with the wheels 4 and 5 for said platform, the effective working height of the latter with respect to the ground may be conveniently varied and maintained.

In combination with this platform construction, use is made of improved gathering and conveying mechanism, which is disposed and formed so that as the machine advances over a field, rows of corn stalks will be engaged, the stalks severed at a point near or above the ground and deposited upon the conveying mechanism and thence to one side of the machine in order that the same may be collected in bundle formation to complete the final shocks. The gathering mechanism in the present instance, consists of a plurality of forwardly projecting guide plates 17, which extend longitudinally of the machine in advance of the gathering side of the platform 1. The plates 17 are preferably located in pairs and are formed with curved forward ends 18, which are so related as to provide between the same guide ways 19 for the reception of the stalks, the curved ends of said plates serving to enlarge the mouth ends of the guide ways in order to direct the corn toward the cutter mechanism, hereinafter to be fully described, and to accommodate the harvester to irregularities in the spacing between adjacent rows of stalks.

At the inner ends of the guide ways 19 the cutter mechanism of the harvester is located. This cutter mechanism includes a plurality of fixed guide fingers 20 which are adapted to be stationarily secured to the front bar 2, and have their upper surfaces suitably recessed to receive a transversely reciprocable cutter bar 21, which is provided with the usual triangular cutting teeth which have serrated edges 22. By this construction the stalks forced longitudinally of the guide ways 19 will be pressed into engagement with the fingers 20 and thence subjected to the action of the transversely reciprocable cutting edges 22, which serve to sever the stalks at a position suitably spaced above the ground line.

In order to effect the reciprocation of the cutter bar, the hub of the wheel 4 is provided with a suitable sprocket 23 over which is trained an endless driving chain 24, this chain leading to a sprocket 25 provided upon a short shaft section 26, which is located and journaled for rotation contiguous to the rear edge of the machine. The section 26 carries a fixed clutch jaw 27, which is adapted to be engaged with a slidable clutch section 28, the latter being suitably feathered or otherwise secured to one end of a longitudinally extending shaft 29, disposed along the rear marginal edges of the platform 1. The section 28 is provided with the usual manually operated clutch lever 30, whereby driving connection between the sections 27 and 28 may be controlled in the usual manner. The shaft 29 is provided at one end with a pinion 31, which is disposed to engage with a similar pinion 32 provided upon a shaft 33, which is suitably journaled for rotation transversely of the platform 1, the arrangement being such that upon the rotation of the shaft 29 motion will be imparted to the shaft 33 so as to effect its positive movement. The forward end of the shaft 33 is provided with a disk 34 upon which is mounted an eccentrically located pin 35, and a pitman 36 is connected at one end with the pin 35 and has its opposite end pivotally connected as at 37 with one end of the cutter bar 21. Manifestly, by this construction the rotation of the shaft 33 will serve to rotate the disk 34 and thence by means of the pitman 36, reciprocatory motion will be imparted to the cutter bar. The cutter bar is securely supported for reciprocation in connection with the guide fingers 20 and by cooperation with said fingers and by means of its serrated cutting edges, the corn stalks would be positively severed.

In order that the stalks may be positively forced longitudinally of guide ways 19 and into engagement with the cutter mechanism, the plates 17 are provided with superimposed angular frames 38, which as shown in Figures 1 and 4, extend parallel with the guide ways 19 and are angularly and upwardly inclined, the rear ends of said frames 38 being disposed a considerable distance above the platform 1. Suitably mounted at the ends of the frames 38 are sprockets 39, around which pass endless chains 40, the said chains being provided with laterally extending fingers 41, which are of sufficient length to project a material distance into the guide ways 19, in order that said fingers may engage with the corn stalks positioned within the guide ways and to advance such stalks positively into engagement with the cutter mechanism. It will be understood that the frames may be suitably covered so as to enclose the chains.

In order to transmit power to the chains 40, the shaft 29 is provided at intervals with pinions 42, which are disposed to mesh with similar gears 43 provided upon the rear ends of a plurality of transversely extending shafts 44, which are mounted for rotation within the platform 1. The forward ends of the shafts 44 are equipped with suitable pinions which operate to drive vertically extending shafts 45, which have their upper ends equipped with sleeves 46 having spherical outer surfaces, the latter being adapted to receive thereabout the upper of the sprockets 39 in order that the motion of the vertically disposed shafts 45 may be transmitted to the angularly situated chains 40. It will be understood that by the control of the clutch construction 27 and 28, the motion of the cutter mechanism may be readily governed and likewise that of the gathering chains.

Carried by the platform 1 and disposed immediately adjacent to the inner end of each of the guide ways 19 are pans 47, which are provided with open forward edge portions and with rearwardly located upstanding walls 48. After the stalks have been severed by the action of the cutter bar, the stalks are still engaged by the fingers 41 and are carried rearwardly and longitudinally of the pans 47, the arrangement being such that the lower ends of the stalks will engage with the upstanding walls 48, and will then be tripped so that when the stalks are released from engagement with the fingers 41, the same will fall so as to rest horizontally upon a longitudinally movable conveyor 49. This conveyor is arranged for horizontal operation and is shown more particularly in Figure 2, in which it will be noted that the conveyor 49 is of the apron variety and is situated to extend horizontally and longitudinally of said platform, the outer surfaces thereof being provided with slats 50, which operate to engage the stalks and to convey the same in unison with the movement of the conveyor. To operate the conveyor certain of the end shafts 44 are provided with rollers 51 around which the conveyor 49 is trained. It will therefore be seen that the rotation of the shafts 44 will effect movement on the part of the conveyor in the direction indicated by the arrow. Suitable means may be provided for taking up the slack in the conveyor 49.

Arising from the platform 1 is a skeleton frame 52 which is of substantially triangular formation and is adapted to provide a support for a plurality of rollers 53, which are situated at the upper and lower ends of a pair of elevator conveyors 54. These conveyors are relatively spaced, the upper of which being disposed in superimposed relation with respect to the lower, and in this instance the said conveyors 54 are of the apron variety and are provided with slats 55 disposed for engagement with the corn stalks. The arrangement of the conveyors 54 with respect to the conveyor 49 is such that material discharged from the conveyor 49 will be delivered between the conveyors 54, and thence jointly engaged by the latter conveyors and moved upwardly and longitudinally of the platform, so as to be elevated above the main operating wheel 4. To impart motion to the conveyors 54, the shaft 33 is provided with a suitable sprocket, around which is trained an endless chain 56, as shown in Figure 3, and this chain is also trained around a second sprocket 57 provided upon a shaft 58 upon which one of the rollers 53 is carried. The shaft 58, in turn, is equipped with a spur gear 59, which is disposed to mesh with a similar gear 60, the latter being carried by the roller shaft of the upper elevator conveyor. By this construction it will be manifest that when the shaft 33 is driven motion will be imparted directly to the lower of the elevator conveyors, and thence through the gearing 59 and 60 to the upper of said conveyors, so that the elevator conveyors will be caused to rotate in the direction indicated by the arrows 61 found in Figure 2. This movement on the part of the elevator conveyors enables the latter to catch the stalks discharged from the conveyor 49 and to convey the stalks upwardly, as heretofore set forth. At this junction it will be observed that the upper of the elevator conveyors is narrower in respect to width than the lower conveyor, a construction which enables the conveyors to securely engage the lower portions of the corn stalks so as to avoid damage to the ears and foliage carried by the upper ends of said stalks. The frame 52 is provided beneath the lower of the elevator conveyors with a wall 62, which has associated therewith a downwardly curved deck 63, and the upper portions of said frame, above the upper of the elevator conveyors, is provided with a pair of cross braces 64.

Carried by one end of the platform 1, beneath the discharge ends of the elevator conveyors, is a pair of receptacles 65 and 66, which include bottom, side and front walls but are open to the rear thereof, as is clearly disclosed in Figure 8, the said receptacles being divided by means of a partition 67. The receptacles 65 and 66 do not extend the full width of the platform 1, but terminate shortly thereof to produce a discharging recess 68 to one side of the platform 1, the said recess serving to facilitate the discharge of the stalks from the machine in shock formation. It will be observed that the discharge ends of the elevator conveyors are so positioned that stalks discharged therefrom will normally gravitate into the receptacle 65, but may be directed into the receptacle 66 by the provision of an adjustable swinging deflector plate 69. The latter is carried by the upper edge of the partition 67 and when the receptacle 65 is being filled, the said plate 69 will assume an upward position, as shown in Figure 2. However, when the said receptacle 65 has been filled to the desired extent, the deflector plate is oscillated to assume substantially the dotted line position, whereby stalks discharged from the elevator conveyors will be directed into the outer receptacle 66 in order that the latter may be filled with a suitable quantity of the stalks. To operate the deflector plate, one end of the latter is provided with a crank 70, with which a link 71 is connected, the said link having its lower end connected in turn with the crank 72 provided upon a transversely extending shaft 73. This shaft leads back to a position contiguous to the drivers seat 74 of the machine, in order that by oscillating the shaft 73, the said deflector plate may assume either of its operative positions. The drivers seat 74 is mounted upon a spring yoke 75, and is situated so that the driver may view the advance of the machine by looking over the upper of the elevator conveyors.

Projecting centrally into the recess 68 from the under part of the platform 1 is a pivoted central part 76, which is situated to normally receive a substantially U shaped bail member 77. This bail member has one of its arms 78 inturned and pivotally mounted within a block 79, which is slidably mounted upon a rod 80 carried by brackets 81 fastened to the wall 62 of the frame 52, the mounting thus afforded for the bail member serving to permit the latter to swing on a substantially vertical arc. The outer or free end of the bail member is provided with a windlass 82, which may be rotated by a manually operated crank 83 and is adapted to have secured thereto one end of a compressing chain 84. Normally, the free end of this chain is provided with a hook 85, which is adapted to engage with an eye 86 formed upon the arm 78. When in this position the chain will be substantially U shaped, and will be so situated that stalks deposited within the receptacles 65 and 66 will have their outer portions received within the loop of the chain. After the receptacles have been filled, the chain is removed from engagement with the eye 86 and is attached to any one of the eyes 87 provided upon the outer arm of the bail member. Then, by winding the windlass 82, the said chain will be drawn tightly around the stalks so as to assemble the latter in bundle formation and to facilitate the tying thereof.

In order to discharge the bundled stalks from the harvester, use is made of a crane 88, which has its lower end connected with a universal joint 89 carried by the platform 1. The upper or outer end of the crane 88 is equipped with a pulley 90, around which is trained a chain 91. This chain has its inner end connected with a drum 92 rotatably carried by the crane and adapted to be actuated through the medium of a crank handle 93. The free end of the chain 91 is connected with a pair of tongues 94 used in elevating or arcing the bundled stalks. In operation, after the stalks within the receptacles 65 and 66 have been compressed by means of the chain 84, the crane 88 is swung so that the tongs 94 thereof may be engaged with the assembled stalks. Then, by operating the drum 92 the chain may be drawn upwardly so as to effect the elevation of the bundled stalks together with vertical swinging movement on the part of the bail member. This upward movement of the stalks serves to draw the latter out of the receptacles 65 and 66 and by reason of the recess 68, to deposit the stalks on the ground, the center part 76 being so situated, as disclosed in Figure 12, that the lower portions of the shock will be spread or widened, so as to produce a base capable of maintaining the shock in an upright and self supporting position. After this operation has been completed, the shock is bound by twine, and the chain 84 is then released from engagement therewith. The machine may then be moved on by raising the bail member so that the latter will assume the vertical position shown in Figure 12 and will thus clear the upper end of the shock. Since the crane has been previously swung to assume the position disclosed in Figure 8, it follows that the machine may then advance independently of the finished shock so as to repeat the cycle of operation above set forth. It will be observed that the bail member 77 is longitudinally adjustable with respect to the rod 80, in order that the same may be adapted to stalks of varying length, the adjusted positions of said bail member being maintained by means of a fixed bar 95, which is provided with notched edges capable of engaging with a tooth or projection provided upon the swinging block 79.

In view of the foregoing description, taken in conjunction with the accompanying drawing, it will be apparent that the present invention provides a machine which may be utilized in a practical way for corn harvesting purposes, the machine being designed primarily to efficiently carry out its several functions and yet to be simple in construction and devoid of undue complication. The machine is preferably drawn by draft animals and to this end the frame or platform 1 is provided with a pivoted tongue 96 and with the usual single trees 97 for connection with the harness of the draft animals. If desired, the angularity of the platform 1 and associated parts may be adjusted by connecting the tongue 96 with a pivoted link 98, which extends upwardly and has its upper end connected with the short end of a pivoted lever 99, which lever extends transversely of the frame 1 and is pivoted thereon as at 100, the rear end of the lever 99 being provided with the usual latch construction for maintaining the lever in positions of adjustment with respect to a segment 101. Since the tongue 96 is held stationarily by its connections with the draft animals, it will be apparent that by oscillating the lever 99, the said frame may be swung about the pivots provided by the axles 6 and 16 so that the height of operation of the cutting mechanism may be conveniently varied.

What is claimed is:

1. In a corn harvester, a portable frame, gathering and conveying mechanism carried by said frame, a receptacle into which material discharged from said gathering mechanism is received, a pivoted bail member cooperating with said receptacle to surround material discharged into the latter means connected to the bail member for compressing the material, and a pivoted crane structure carried by said frame and capable of elevating the bundled material.

2. In a corn harvester, a portable frame including gathering and conveying mechanisms, a receptacle situated to receive material discharged from said conveyor, a pivoted bail member carried by said frame and situated to receive the ends of the stalks discharged into said receptacle, a pivoted crane structure carried by said frame and capable of swinging said bail member and a bundle of stalks retained thereby to an upright position, whereby said stalks may be discharged from the machine.

3. In a corn harvester, a portable frame, gathering and conveying mechanism carried by said frame, a receptacle situated at the discharge end of said conveying mechanism and capable of receiving material discharged therefrom, a pivoted bail member situated contiguous to said receptacle, a manually operated winding device carried by said bail member, and a cable connected with said winding device and capable of being placed around stalks positioned within said receptacle and bail member.

4. In a corn harvester, gathering and conveying mechanisms, a receptacle capable of receiving material discharged from said conveying mechanism, a pivoted bail member carried by said frame and situated contiguous to said receptacle, means whereby said bail member may be adjusted longitudinally with respect to said receptacle, and compressing means carried by said bail member.

5. In a corn harvester, a frame, gathering and conveying mechanisms mounted upon said frame, a support capable of receiving material discharged from said conveying mechanism, a spreading device projecting longitudinally from said support, and a pivoted bail member capable of having secured thereto the material discharged upon said support, and means for operating the bail member so that material carried thereby may be elevated to assume a substantially vertical position, the said spreading device being situated to engage with the material to effect the spreading of the base thereof.

In testimony whereof I affix my signature.

WILLIAM E. KOCH.